United States Patent [19]
Khan et al.

[11] Patent Number: 5,625,277
[45] Date of Patent: Apr. 29, 1997

[54] DYNAMIC MECHANICALLY SWITCHED DAMPING SYSTEM AND METHOD FOR DAMPING POWER OSCILLATIONS USING THE SAME

[75] Inventors: Aftab H. Khan; Willie K. Wong, both of Cary; Kevin J. Timko, Apex; John G. Reckleff, Raleigh, all of N.C.

[73] Assignee: ABB Power T&D Company Inc., Raleigh, N.C.

[21] Appl. No.: 379,920

[22] Filed: Jan. 30, 1995

[51] Int. Cl.$^6$ .................................................. H02P 9/00
[52] U.S. Cl. .............................. 322/58; 307/102; 323/215
[58] Field of Search .............................. 322/58; 323/233, 323/298, 369; 361/54

[56] References Cited

U.S. PATENT DOCUMENTS

| | | | |
|---|---|---|---|
| 4,080,559 | 3/1978 | Wright et al. | 322/58 |
| 4,434,376 | 2/1984 | Hingorani | 307/102 |
| 4,567,423 | 1/1986 | Dobsa et al. | 322/58 |
| 4,724,333 | 2/1988 | Hedin | 307/105 |
| 5,198,745 | 3/1993 | Larsen et al. | 322/58 |

OTHER PUBLICATIONS

Angquist, L. et al, "Power Oscillation Damping Using Controlled Reactive Power Compensation—A Comparison Between Series and Shunt Approaches", *IEEE Transactions on Power Systems 1993*, 8(2), 687–700.

Shimojo, T. et al., "Improvement of Damping of Tie-Line Power Swing by Means of Shunt Capacitor Switching Control", Cigre–IFAC Symposium, Florence, 1983.

Miller, T.J.E., "Reactive Power Control in Power Systems", pp. 143–145.

*Primary Examiner*—Steven L. Stephan
*Assistant Examiner*—Nicholas Ponomarenko
*Attorney, Agent, or Firm*—Woodcock Washburn Kurtz Mackiewicz & Norris

[57] ABSTRACT

A dynamic mechanically-switched damping (DMSD) system is described which utilizes one or more mechanical switches and appropriate controls to switch series or shunt reactive impedances in order to provide power oscillation damping in power systems. The DMSD system provides a controller which can be configured based on the number of mechanical switches in the DMSD system, the type of reactive impedances interfaced to the power system by each switch and the magnitude of each of the reactive impedance. The DMSD system monitors parameters of the power system and the controller generates a modulation signal based on the monitored parameters. The modulation signal is processed to identify a reactive impedance of the available DMSD system reactive impedances required to damp power oscillations. Appropriate switches are selected for supplying the required reactive impedance. A switching control signal is generated and output to each of the selected switches to synchronously open or close the switch at a predetermined instant.

24 Claims, 16 Drawing Sheets

| APPLICATION | MONITORED QUANITY | |
|---|---|---|
| | CLOSE | OPEN |
| SHUNT CAPACITOR AND REACTOR | BUS VOLTAGE | MECHANICAL SWITCH CURRENT |
| SERIES CAPACITOR | CAPACITOR VOLTAGE | LINE CURRENT |
| SERIES REACTOR | REACTOR VOLTAGE | LINE CURRENT |

*Fig. 12*

| APPLICATION | MONITORED QUANTITY | |
|---|---|---|
| | CLOSING INSTANT | OPENING INSTANT |
| SHUNT CAPACITOR | VOLTAGE ZERO ACROSS MECHANICAL SWITCH | CONTACT SEPARATION FOLLOWING CURRENT ZERO, MAXIMIZING ARCING TIME AND REDUCING/ELIMINATING REIGNITIONS OR RESTRIKES (ELECTRICAL BREAKDOWN ACROSS CONTACTS) |
| SHUNT REACTOR | BUS VOLTAGE PEAK | CONTACT SEPARATION FOLLOWING CURRENT ZERO, MAXIMIZING ARCING TIME AND REDUCING/ELIMINATING REIGNITIONS OR RESTRIKES (ELECTRICAL BREAKDOWN ACROSS CONTACTS) |
| SERIES CAPACITOR | CAPACITOR VOLTAGE ZERO | CONTACT SEPARATION FOLLOWING CURRENT ZERO, MAXIMIZING ARCING TIME AND REDUCING/ELIMINATING REIGNITIONS OR RESTRIKES (ELECTRICAL BREAKDOWN ACROSS CONTACTS) |
| SERIES INDUCTOR | INDUCTOR VOLTAGE PEAK | CONTACT SEPARATION FOLLOWING CURRENT ZERO |

*Fig. 14*

DYNAMIC MECHANICALLY SWITCHED DAMPING SYSTEM AND METHOD FOR DAMPING POWER OSCILLATIONS USING THE SAME

FIELD OF THE INVENTION

The invention relates generally to a dynamic mechanically switched damping system and a method for using the same. More particularly, the invention relates to synchronously switching reactive impedances in response to power system disturbances to damp power oscillations.

BACKGROUND OF THE INVENTION

A high-voltage circuit breaker is a device used in the distribution of three-phase electrical energy in a power system. When a sensor or protective relay detects a fault or other system disturbance in connection with a protected circuit of the power system, the circuit breaker operates to physically separate current-carrying contacts in each of the three phases by opening the circuit to prevent the continued flow of current. A recloser differs from a circuit breaker in that a circuit breaker opens a circuit and maintains the circuit in the open position indefinitely, whereas a recloser may automatically open and reclose the circuit several times in quick succession to allow a temporary fault to clear and, thus, avoid taking the circuit out of service unnecessarily.

The major components of a circuit breaker or recloser include the interrupters, which function to open and close one or more sets of current-carrying contacts housed therein; the operating or driving mechanism, which provides the energy necessary to open or close the contacts; the arcing control mechanism and interrupting media, which create an open condition in the protected circuit; one or more tanks for housing the interrupters; and the bushings, which carry the high-voltage electrical energy from the protected circuit into and out of the tank(s). In addition, a mechanical linkage connects the interrupters and the operating mechanism.

Modern mechanical switches utilized in high-voltage circuit breakers comprise the interrupters and the operating mechanism which are interconnected by the mechanical linkage. The interrupters provide one or more sets of current-carrying contacts. When the switch is closed, these current-carrying contacts are electrically interfaced. As the switch is opened, an arc forms between some of the current-carrying contacts. Such arcing can cause the contacts to erode and, perhaps, to disintegrate over time. Once an arc has formed, it is extremely difficult to extinguish it until the arc current is substantially reduced. Thus, modern interrupters inject a compressed electrically insulating gas, such as $SF_6$ into the cavity of the tank housing the interrupter to facilitate in extinguishing the arc. Once the arc is extinguished, the protected circuit is opened thereby preventing current flow.

The operating mechanism provides the necessary operating forces for opening and closing the interrupter contacts. Operating mechanisms such as a hydraulic spring type driving unit require relatively little energy to drive the interrupters open or closed and are easily adapted to store increased numbers of such operations to permit rapid and repeated operations. Moreover, independent pole operating mechanisms provide independent control for each of the three phases of the power system, i.e., each of the three interrupters can be opened or closed independently of one another.

Typically, a reactive or resistive impedance is coupled between the arcing contacts of the interrupter to control the arcing by equalizing the voltages at the respective breaks in a multi-interrupting point type circuit breaker, i.e., one with more than one set of contacts. Since resistive impedances consume real power, electric utilities prefer to interface reactive impedances with the power system.

Voltage and current transients generated during the energization of the reactive impedances have become an increasing concern for the electric utility industry in terms of power quality for voltage-sensitive loads and excessive stresses on power system equipment. For example, modern digital equipment requires a stable source of power. Moreover, computers, microwave ovens and other electronic appliances are prone to failures resulting from such transients. Even minor transients can cause the power waveform to skew, rendering these electrical devices inoperative. Therefore, utilities have set objectives to reduce the occurrence of transients and to provide a stable power waveform.

Conventional solutions for reducing the transients resulting from reactive impedance energization include circuit breaker pre-insertion devices, for example, resistors or inductors, and fixed devices such as current limiting reactors. While these solutions provide varying degrees of mitigation for reactive impedance energization transients, they result in added equipment, added cost, and can result in added reliability concerns.

For particular types of reactive impedances, the maximum transients are associated with closing the circuit breaker at the peak of the system voltage waveform. One solution to this problem is to add timing accuracy to synchronously close the circuit breaker at the instant the system voltage is substantially zero. In this way, the voltages on both sides of the mechanical switch at the instant of closure would be nearly equal, allowing for an effectively "transient-free" energization.

The reactive impedance may be capacitive or inductive. A reactive impedance connected in series with the power system is switched into the power system when the switch is opened. In contrast, the shunt reactive impedance is switched into the system when the switch is closed. The insertion or removal of the reactive impedance in the power system alters either the series impedance of the transmission or the reactive power flow in a power system. Therefore, switching the reactive impedances into and out of the power system directly or indirectly effects real power flow in the power system.

FIG. 1 shows an example of one possible power system configuration with four generators 4, 5, 6, 7. These generators supply power to loads 1, e.g., homes, factories, etc. A transmission system connected between the generators 4, 5, 6, 7 and loads 1 consists of transformers and transmission lines 2. Transmission lines 2 are primarily inductive (X) for the purposes of power flow analysis. The transmission system is interconnected by system busses 3. The generators 4, 5, 6, 7 supply real power to be consumed by loads 1 and reactive power consumed by the inductance of transmission lines and transformers.

Power oscillations in the power system may be caused by a power system disturbance such as lightning or a short circuit in the power system. Such power oscillations may lead to instability of the power system or create operating difficulties. These power oscillations are the result of interactions between generators 4–7 of the power system as an attempt is made by these generators to reach a steady-state after a power disturbance.

The time scale of the power oscillation phenomena is illustrated in FIG. 2. Each cycle of the power oscillation 8 typically has a period from about 0.5 sec. to about 5 seconds. Power system voltages and currents 9 are either about 50 or about 60 Hz corresponding to a period of approximately 20 msec per cycle or approximately 17 msec. per cycle, respectively. In other words, the power oscillation phenomena is a relatively slow phenomena compared to 60 Hz oscillations.

One approach used to combat power oscillations generated after a power disturbance is the use of Power System Stabilizers (PSS) connected directly to the power system generators. The PSS is a control system which attempts to modulate and damp the power oscillations directly at the generator by controlling parameters of the generator directly. Referring back to FIG. 1, power oscillations between generators 4 and 5 might effectively controlled by the PSS approach. However, the PSS is difficult to tune or coordinate with other PSS to provide effective damping of inter-area power oscillations, such as power oscillations between generators 4, 5 and generators 6, 7, which are separated by large distances, and thus, large inductive reactances.

An alternative means of damping power oscillations can be provided through the switching of reactive impedance one or more times during each cycle of the power oscillation at appropriate instants.

The switching of a series reactive impedance controls power flow by altering primarily the series impedance and, therefore, the current flow in the series connection of the power system. The switching of a shunt reactive impedance alters primarily the voltage at the point of connection in the power flow, thereby providing some control of power flow. The repetitive switching of reactive impedances at the appropriate points of power oscillations in the system can provide effective damping of the oscillations. Fundamentally, the shunt and series approaches provide similar power oscillation damping benefits, however, the series approach is generally regarded as more effective from a damping MV Ar perspective [L. Angquist, B. Lundin, J. Samuelsson, "Power Oscillation Damping Using Controlled Reactive Power Compensation—A Comparison Between Series and Shunt Approaches," IEEE Transactions on Power Systems, Vol. 8, No. 2, May 1993.].

Until recently, mechanical switches for switching series and shunt reactive impedances were specified only for very slow switching control, typically switching these elements only once or twice per day. Thus, damping control using mechanically switched systems required a number of redundant circuit breakers which would be sequentially opened and/or closed to damp power oscillations. Modern damping systems have failed to use the advantages of faster, more reliable, mechanical switches now available. An example of such a system has been disclosed by T. Shimojo, M. Udo, M. Masui, T. Matsushima, "Improvement Of Damping of Tie-Line Power Swing By Means Of Shunt Capacitor Switching Control," CIGRE-IFAC Symposium, Florence, Italy, 1983.

A static or solid-state switch such as a thyristor has been used for switching reactive impedances quickly for power oscillation damping (often referred to as Static V Ar Compensators (SVC) and Thyristor-Controlled Series Capacitors (TCSC), respectively). Mechanically-switched reactive impedances are sometimes included as part of these systems, however, the damping functions for power oscillations are performed completely by the solid-state or thyristor switched reactive impedances.

The use of thyristor switches has numerous practical drawbacks. For instance, commercially available thyristor switches have voltage ratings well below voltage levels in power systems in which power oscillation damping is desired. Thus, such thyristor based systems rely on the use of a voltage step-down transformer in transmission system applications adding appreciable cost to the overall switching system. Thyristor switches also have continuous real power losses which result in further costs. Moreover, thyristor switches require active cooling systems thereby additionally increasing the cost of the overall switching system. The added complexity of the overall switching system tends to degrade system reliability.

Therefore, there is a need for a dynamic mechanically-switched damping system which can provide damping control at a reduced cost, with less power loss, decreased complexity, and greater design and application flexibility. Such a damping system should include reactive impedances which may be synchronously switched at a relatively fast rate.

SUMMARY OF THE INVENTION

The present invention fulfills this need by providing a dynamic mechanically-switched damping (DMSD) system having a mechanical switch connected to interface reactive impedances to the power system and a controller coupled to a the mechanical switch for controlling the operation of the mechanical switch to damp power oscillations sensed by sensors coupled to the power system. The controller is preferably capable of controlling the operation of the mechanical switch so as to minimize the generation of the transients generated when operating the mechanical switch.

In a preferred embodiment of the invention, the controller provides a damping controller for generating switching command signals indicative of damping control information, and a switching controller coupled to the damping controller and the mechanical switch for generating, based on the damping control information, a switching control signal output to the mechanical switch.

The controller according to a preferred embodiment of the invention is configurable depending upon whether the reactive impedance is capacitive or inductive and whether the reactive impedance is interfaced to the power system in a shunt or a series configuration. In a more preferred embodiment, a plurality of mechanical switches are provided by the DMSD system such that each switch is capable of interfacing a different reactive impedance to the power system. According to this embodiment, the controller preferably provides a reactance selector for generating a reactance signal indicative of the reactive impedance and a modulation frequency required to damp the power oscillations, and distribution logic coupled to the reactance selector for processing the reactance signal to generate at least one switching command signal identifying which one of the plurality of the mechanical switches is to be operated and the frequency to operate the mechanical switch.

A method of damping power oscillations in a power system following a power disturbance by mechanically switching reactive impedances interfaced with the power system is also provided by the present invention. According to the inventive method parameters of the power system are monitored, power oscillations are sensed based on the monitored parameters, a switching control signal is generated in response to the sensed power oscillations, a switching instant based on the monitored parameters to switch the selected reactive impedance to minimize the generation of transients is determined, and a mechanical switch is operated in response to the switching control signal at approximately the switching instant to damp the detected power oscillations.

BRIEF DESCRIPTION OF THE DRAWINGS

The present invention will be better understood, and its numerous objects and advantages will become apparent by reference to the following detailed description of the invention when taken in conjunction with the following drawings, in which:

FIG. 12 shows a table of system parameters monitored by the synchronous switching controller according to the invention;

FIG. 14 shows a table outlining the desired switching instant for each type of reactive impedance according to the invention;

DETAILED DESCRIPTION OF THE INVENTION

Figure 1:
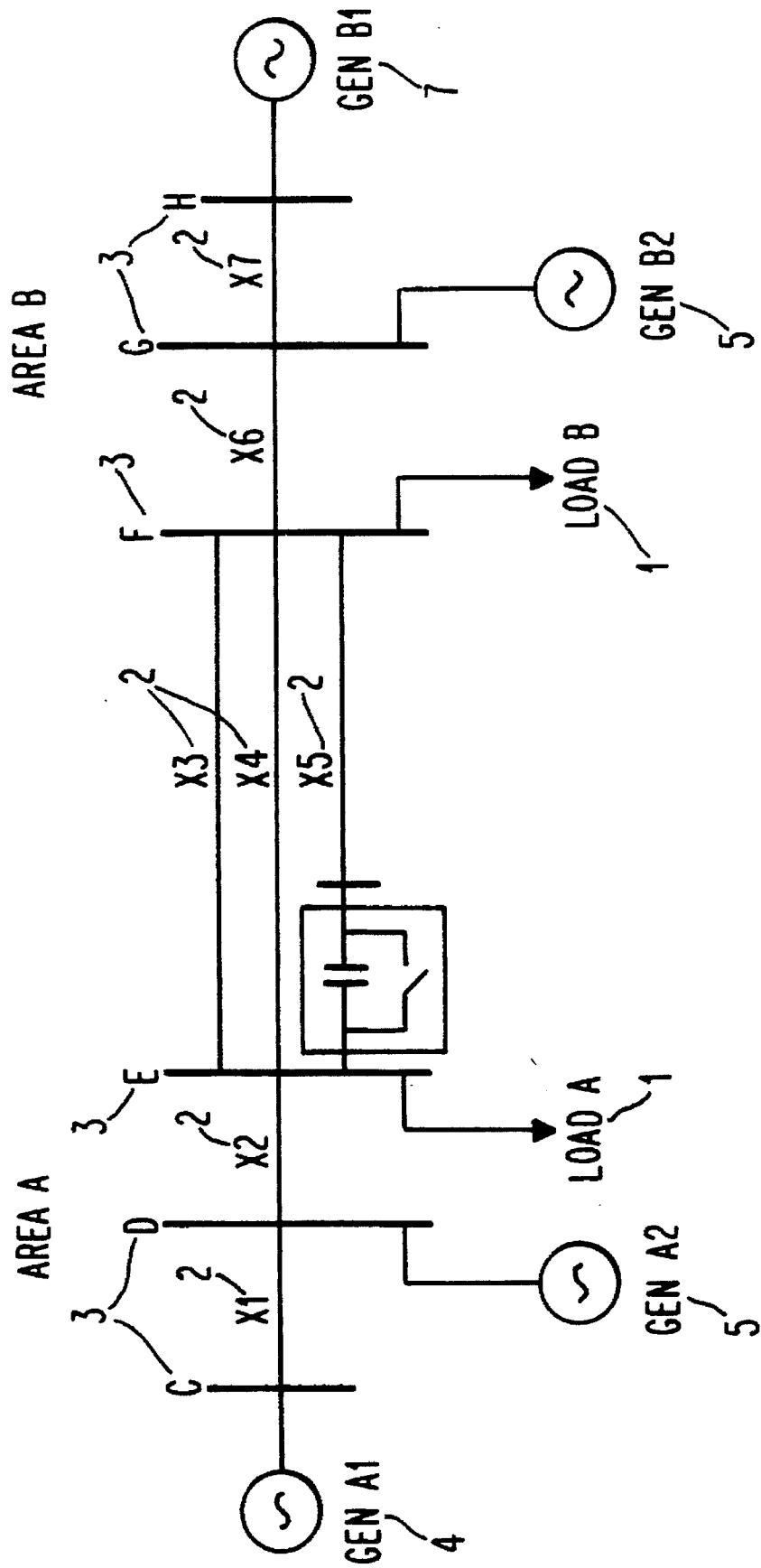
FIG. 1 shows an example of one possible power system configuration.
Figure 2:
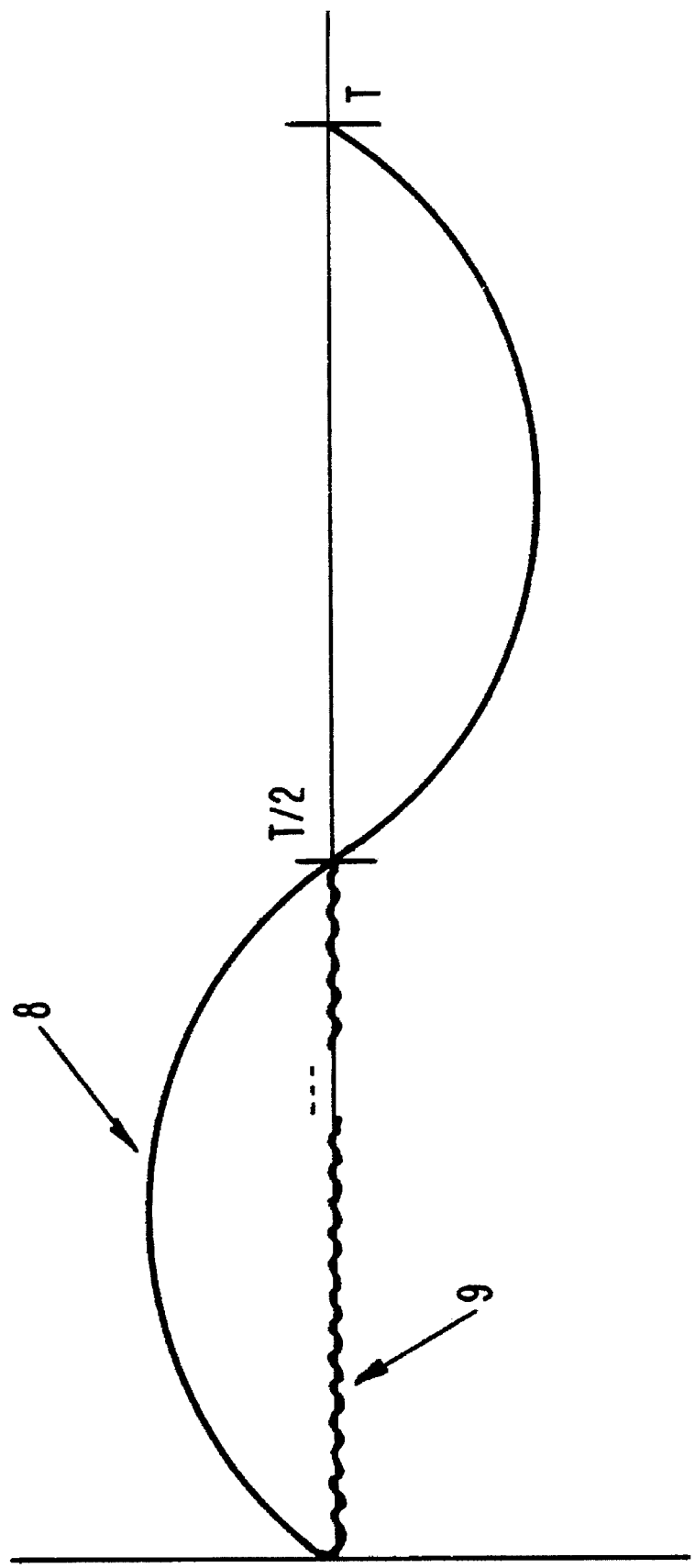
FIG. 2 shows a time scale of the power oscillation phenomena.
Figure 3:
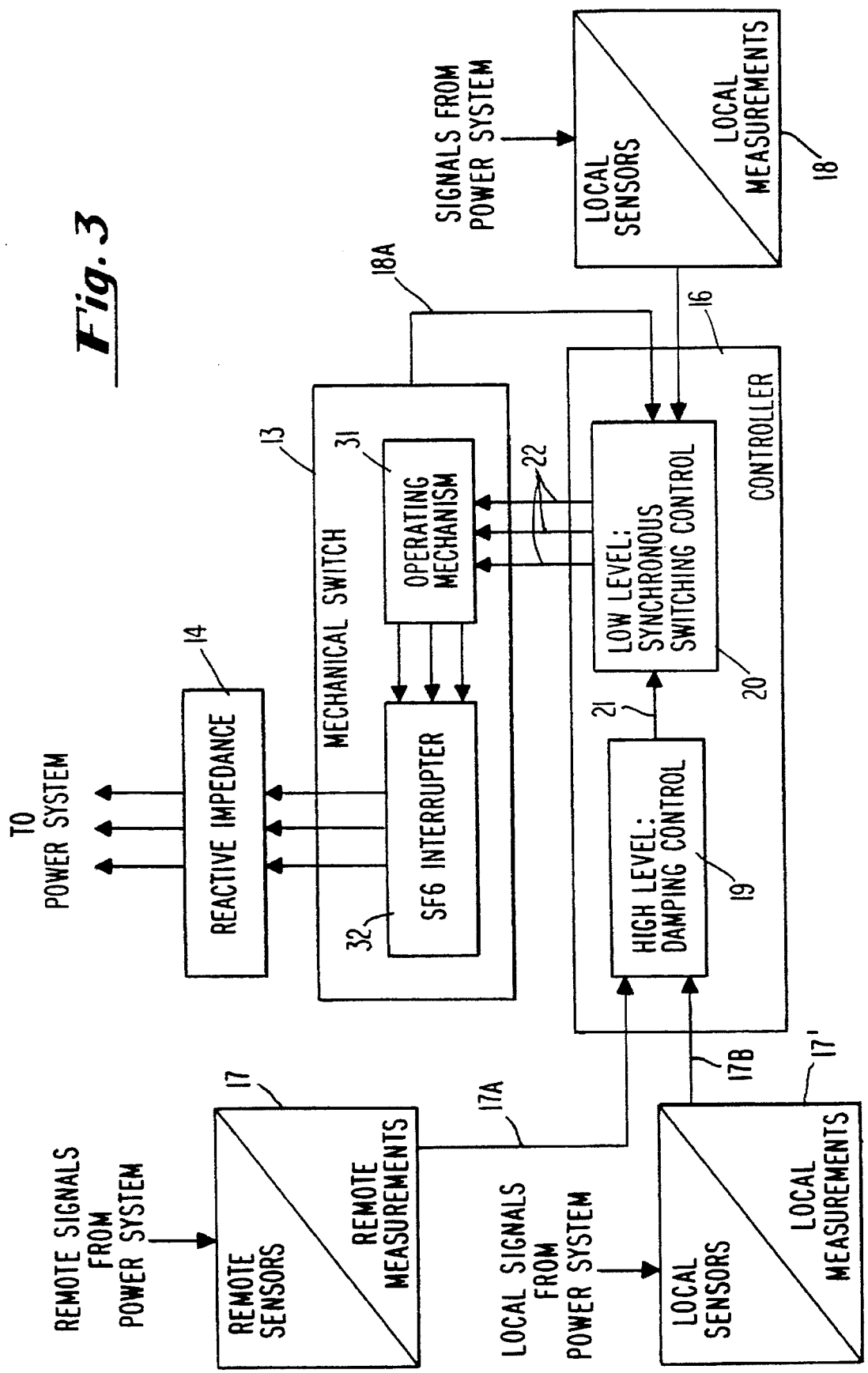
FIG. 3 shows a functional block diagram of a dynamic mechanically-switched damping system (DMSD) according to a preferred embodiment of the invention.

FIG. 3 shows a functional block diagram of a dynamic mechanically-switched damping system (DMSD system) according to a preferred embodiment of the invention. The mechanical switch 13 comprises interrupters 32 and an operating mechanism 31. Preferably mechanical switch 13 is a 3-phase switch, i.e., comprising three interrupters, each associated with one of the three phases. The interrupters are preferably filled with $SF_6$ or an equivalent insulating gas. However, vacuum interrupters may be used at operating voltages below about 34.5 kV. The operating mechanism is preferably a hydraulic spring type. In addition, the operating mechanism preferably provides independent pole operation capability so that each interrupter may be operated independently. The mechanical switch 13 is operable to interface reactive impedances 14 with the power system.

Sensors (i.e., remote sensors depicted by block 17 and local sensors depicted by blocks 17' and 18) measure parameters of the power system and provide a plurality of measurement signals (i.e., remote measurement signals 17A and local measurement signals 17B and 18B) to the controller 16. The controller 16 preferably comprises a damping controller 19 and a synchronous switching controller 20. The damping controller receives an input of the measurement signals 17A, 17B and processes the signals. Specifically, the damping controller is capable of detecting a power disturbance for which power oscillation damping is required.

Figure 4:
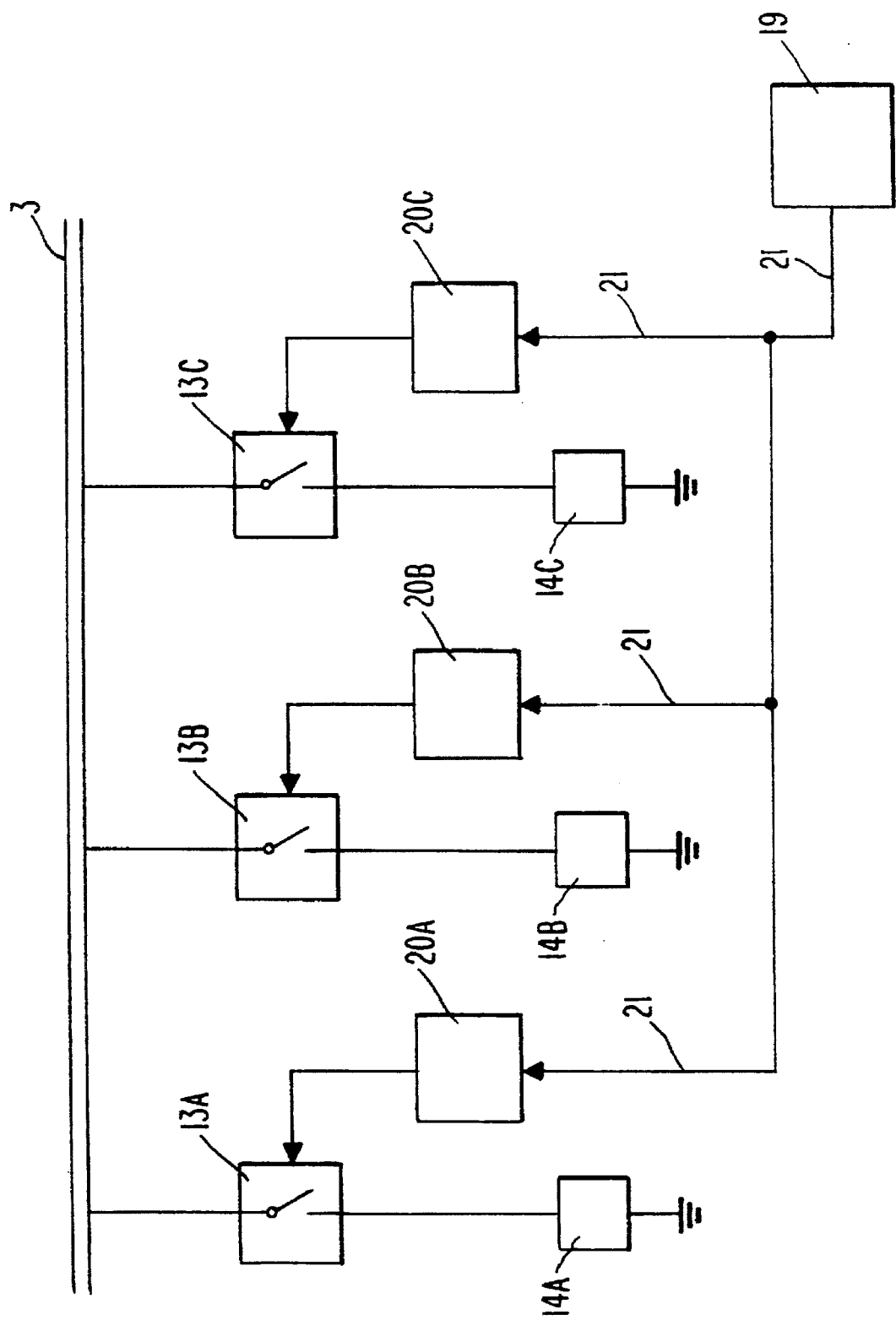
FIG. 4 shows an example of a multi-switch DMSD system.

It should be understood that more than one mechanical switch 13 may be used so that different reactive impedances 14 may be interfaced with the power system depending upon the requirements of the power system. The damping controller as described in detail below is configurable based on the number of mechanical switches used and the magnitudes and type of reactive impedances used. For example, FIG. 4 shows a multi-switch DMSD system. Reactive impedances 14A, 14B, and 14C may each be a different type (i.e. shunt capacitor, series inductor, etc.) and may have different magnitudes, e.g. 10 MVAr, 20 MVAr and 30 MVAr, respectively. Thus, based on the measurement signals and the overall system configuration, the damping controller outputs switching command signals 21. The switching command signals are, thus, indicative of the amount of reactive impedance to be connected or disconnected to the power system. More practically, the switching command signal identifies a particular mechanical switch to be opened or closed. The switching command signal 21 is output at a rate based on the switching modulation frequency required to damp the power oscillations.

The synchronous switching controller 20 receives the switching command signal 21 and measurement signals 18B and local status measurement signals 18A from mechanical switch 13 and processes these inputs to generate switching control signals 22 which cause the operating mechanism 31 of the appropriate mechanical switch 13 to open or close at an instant which minimizes transient formation.

Figure 5:
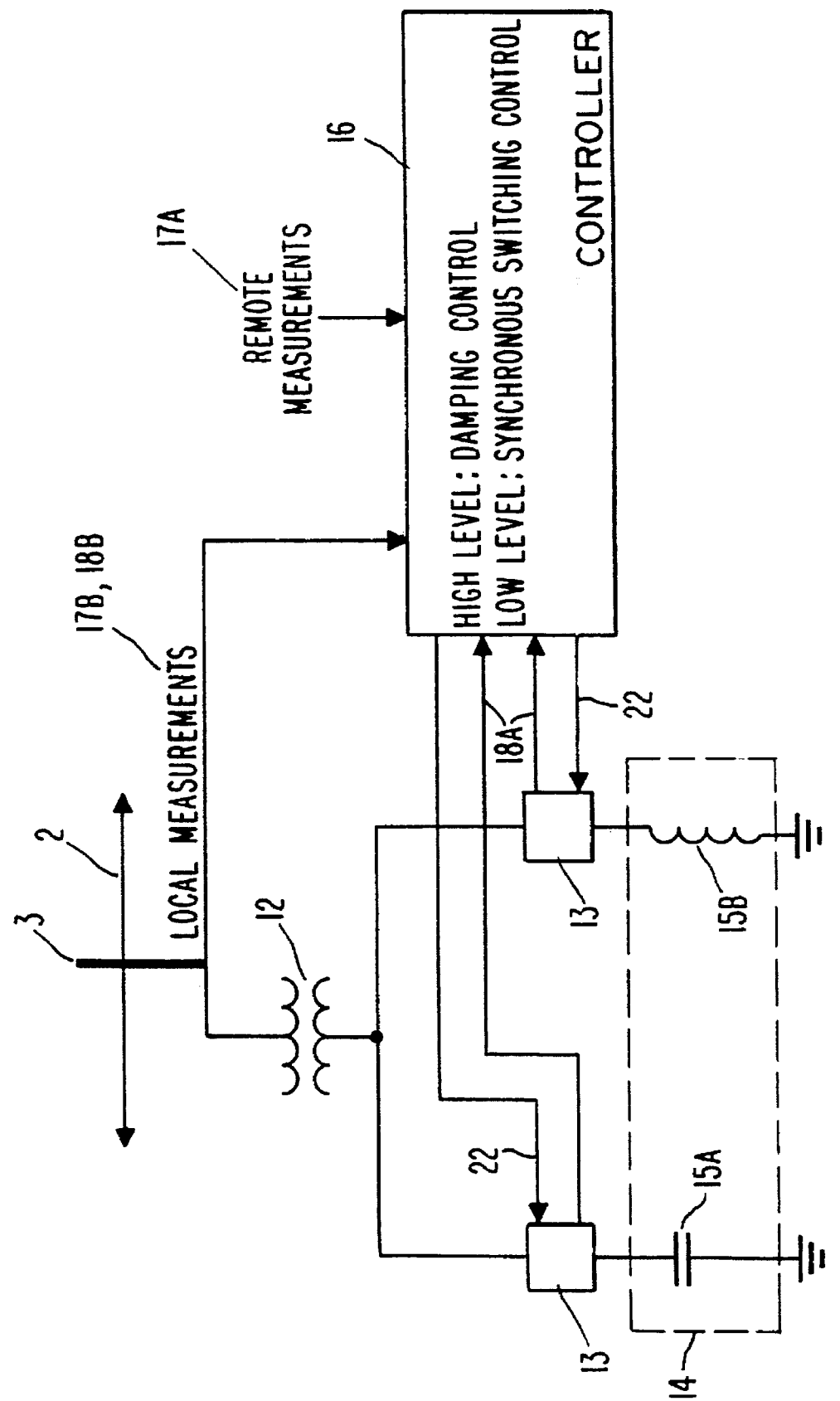
FIG. 5 shows examples of shunt reactive impedances according to the invention.
Figure 6:
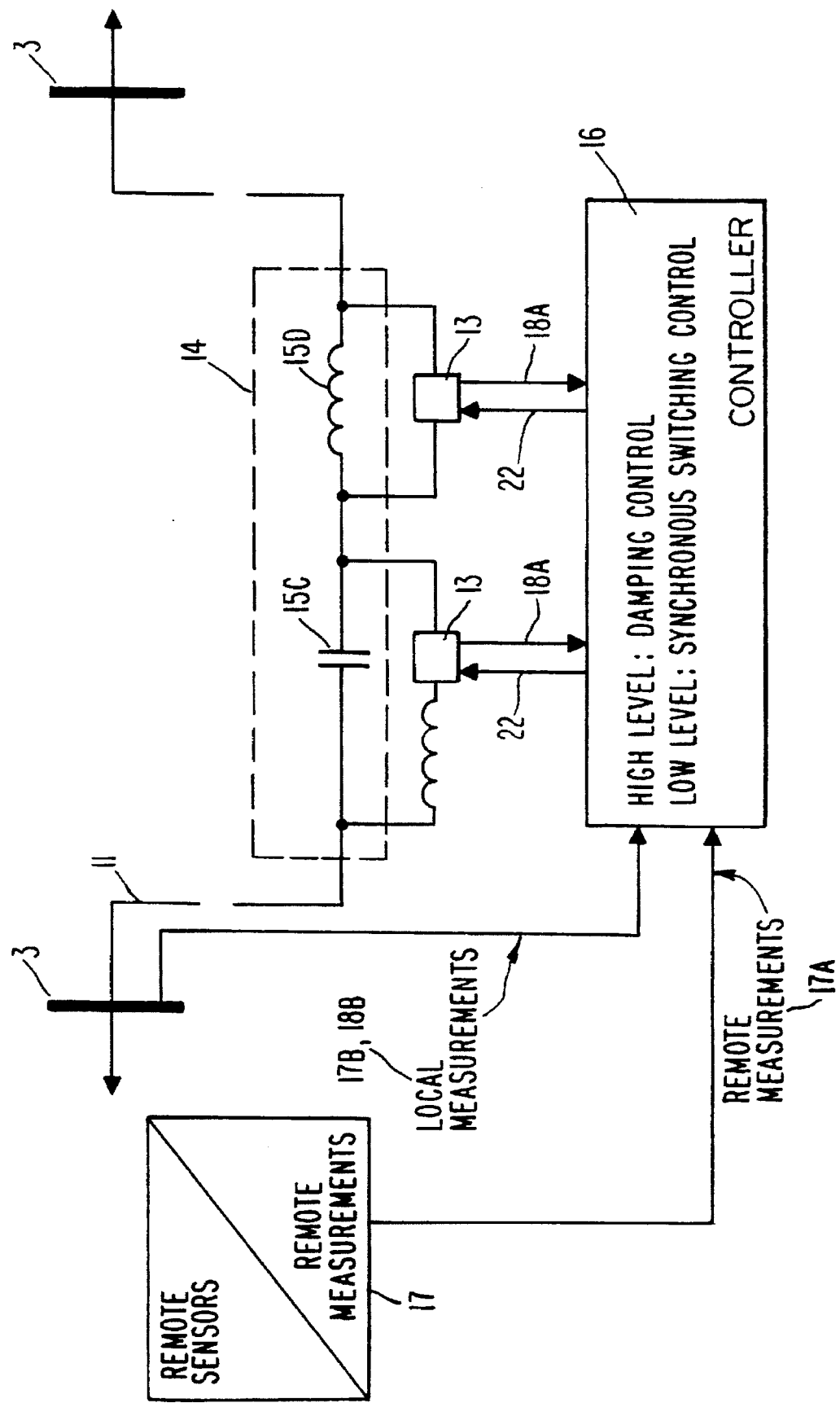
FIG. 6 shows examples of series reactive impedances according to the invention.

The DMSD system is operable with either series or shunt switched reactive impedances. The overall layout of the shunt and series configurations of the invention are shown in FIGS. 5 and 6, respectively. In the shunt configuration shown in FIG. 5, the DMSD system is connected to a system bus 3 connected to a power system transmission line 2, local generator and/or loads. A voltage step-down transformer 12 may or may not be used to interface the mechanical switch and reactive impedances to the bus in the shunt configuration. The need for a voltage step-down transformer in the DMSD system is based upon economical constraints particularly at extra high voltages where the cost of mechanical switches and reactive impedances can be high. A shunt reactive impedance 14 may essentially comprise a capacitor 15A or an inductor 15B as shown in FIG. 5. However, it should be understood that the reactive impedances connected to a mechanical switch would typically be the same for each of the three phases. Thus, the capacitor 15A and inductor 15B are shown in FIG. 5 merely to exemplify a shunt capacitive impedance and a shunt inductive impedance respectively. Local measurements 17A, 17B from bus 3 and remote measurements 17A from remote generators, buses, etc. may be provided as an input to controller 16 and processed by the damping controller. Local measurements 18B from bus 3 and from mechanical switches 13 and remote measurements 17A from remote generators, buses, etc. may also be provided as an input to controller 16 but are processed by the synchronous switching controller.

In the series configuration shown in FIG. 6, the DMSD system is connected in series to a power system transmission interconnection 11 between two power system busses 3. The reactive impedance 14 in the series configuration may also be primarily capacitive, using for example a capacitor 15C, or inductive, using an inductor 15D. It should again be understood that a mechanical switch would typically employ three phases in which each reactive impedance is essentially the same. Local measurements 17B, 18B from bus 3 and remote measurements 17A from remote generators, buses, etc. may be provided as an input to controller 16 and processed by the damping controller. Local measurements 18B from bus 3 and 18A from mechanical switches 13 and remote measurements 17A from remote generators, buses, etc. may also be provided as an input to controller 16 but are processed by the synchronous switching controller.

The power system parameters used by the controller of the DMSD system are preferably monitored using conventional transducers which may include, for example, current, voltage, and frequency transducers. The damping controller 19 (FIG. 4) has as input the local measurement signals 17B, 18B and remote measurement signals 17A (FIGS. 5 and 6) which may include one or a combination of different power system parameters. For example, the local measurements 17B to the controller may include local bus voltages (V), connected transmission line currents (I), connected generator angular speed ($\omega$), local frequency (f), and phase angle differences ($\Delta\phi$). Additionally, remote measurements 17A may be used which can include remote bus voltages (V), remote transmission line currents (I), remote generator speed ($\omega$), and remote bus frequencies (f). The locally and/or remotely monitored signal(s), may be filtered from the sensors and used directly as input signals to the damping controller 19. Alternatively, the measured signals may be used to synthesize the input signals. The synthesizer (not shown) may monitor local power system parameters to synthesize remote power system parameters for use as the input signal.

Figure 7:
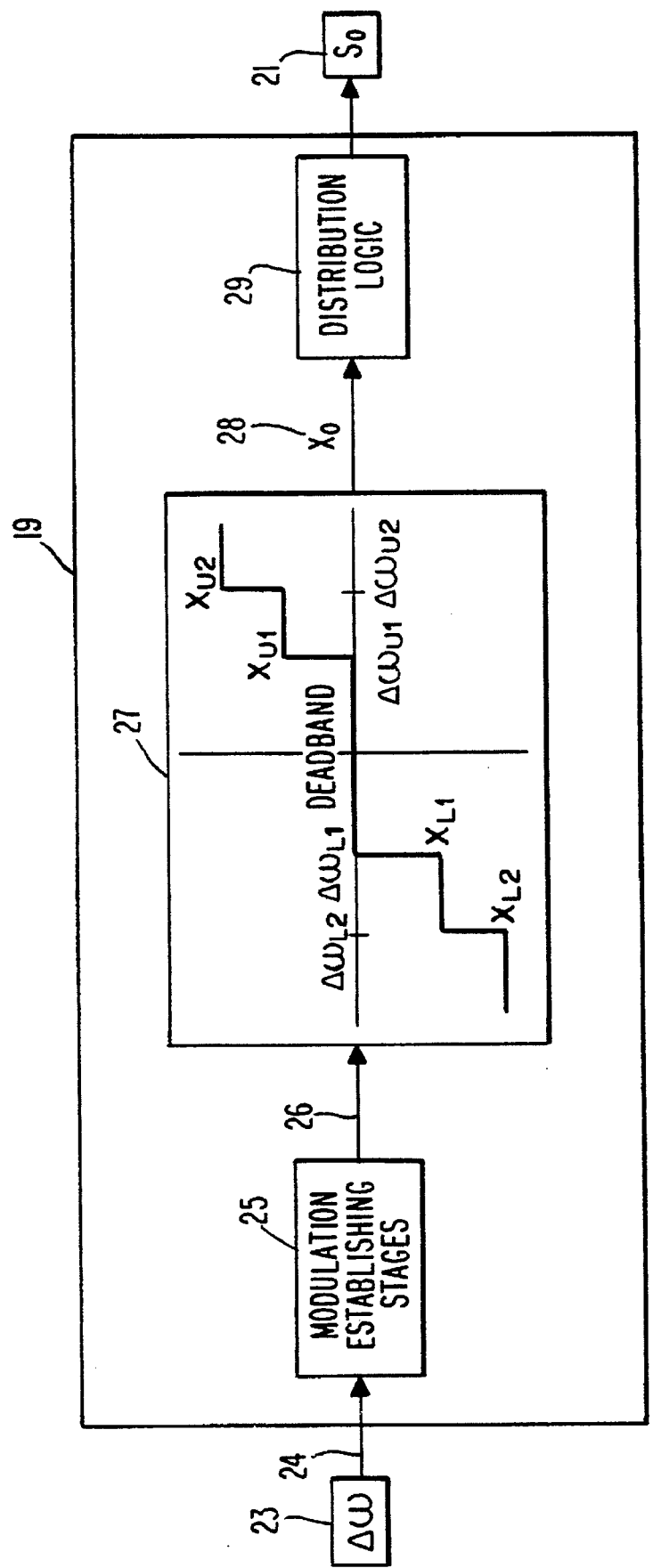
FIG. 7 shows a block diagram of a damping control concept according to the invention.
Figure 8:
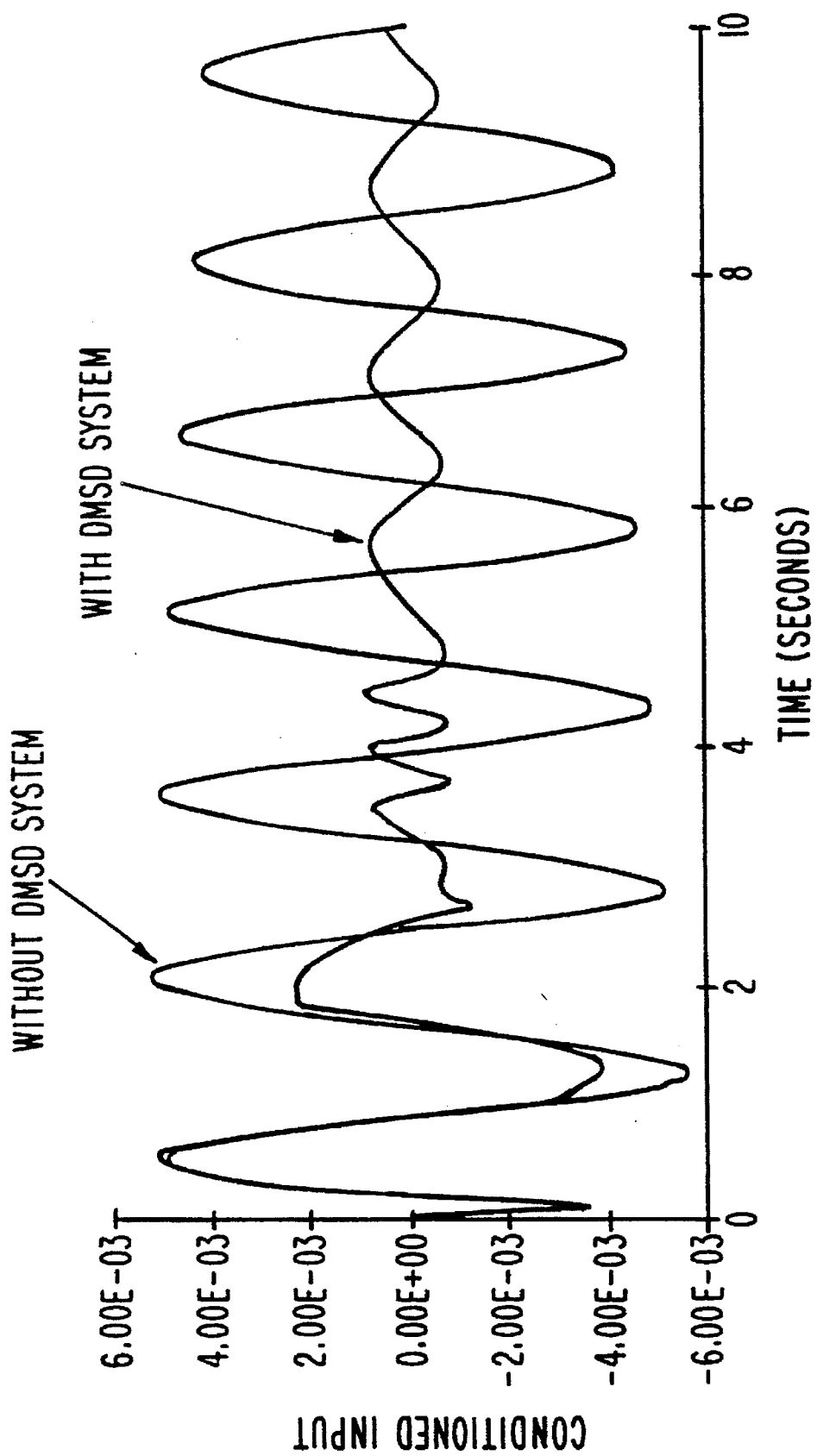
FIG. 8 shows a speed deviation signal following a system disturbance conditioned for use by the damping controller.

A block diagram of a damping control concept according to the invention is shown in FIG. 7. One of the input signals 23, such as generator angular speed ($\omega$) is received by the damping controller 19 after appropriate signal conditioning provided by stage 23 to convert the raw angular speed signal generated by a speed sensor into a speed deviation signal ($\Delta\omega$) 24. A typical speed deviation signal 24 following a system disturbance, conditioned for use by the damping controller 19 is shown in FIG. 8. The speed deviation signal 24 is processed by a modulation establishing stage 25 which may consist of linear transfer function stages utilizing Laplace-transforms or z-transforms. The modulation establishing stage 25 in effect filters the speed deviation signal 24 to produce a modulation signal 26 indicative of the detected power oscillations adjusted for delays associated with processing and expected switching times. Thus, the modulation signal 26 has a frequency corresponding to the modulation frequency required to damp the power oscillations and a magnitude related to the magnitude of the power oscillations.

A reactance selector 27 is connected to the output of the modulation establishing stage 25 to receive the modulation signal 26. The reactance selector preferably consists of one or more steps as shown in FIG. 7 depending on the number of switchable fixed reactances (i.e., depending upon the number of mechanical switches used by the DMSD system) in the DMSD system. The reactance selector preferably provides a deadband filter to inhibit unnecessary switching. The output of the reactance selector 27 is a reactance signal 28 indicative of the reactive impedance needed and the modulation frequency required to damp the power oscillations.

Figure 9:
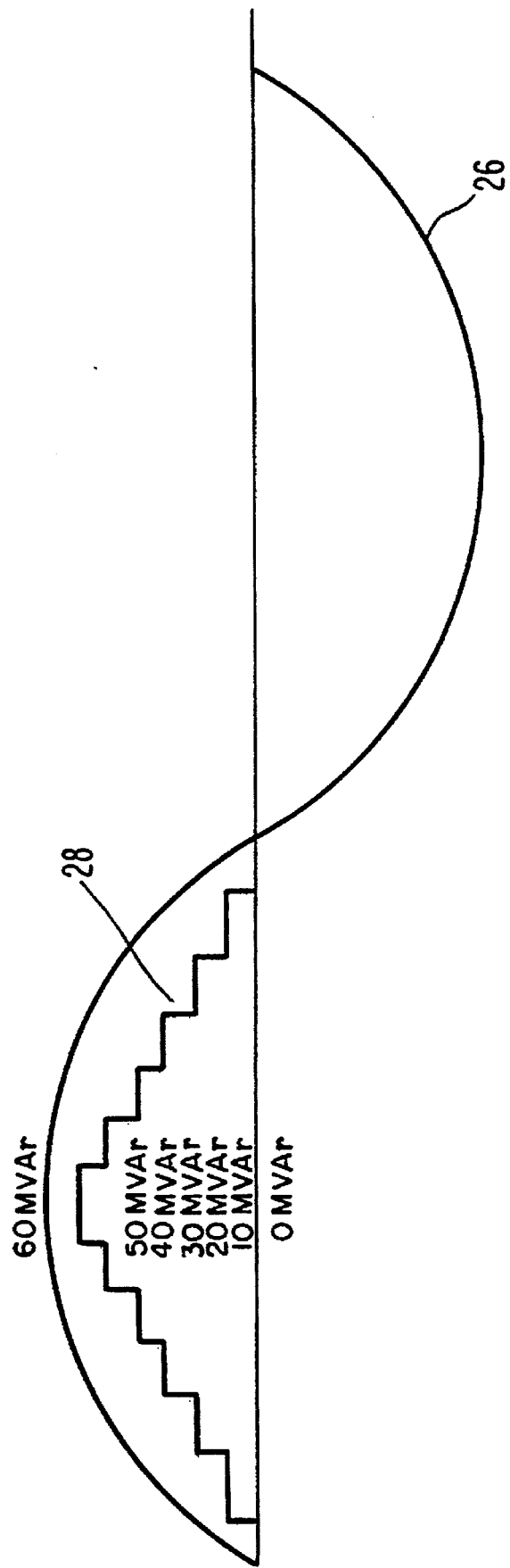
FIG. 9 shows an example of a modulation signal input to the reactance selector and the reactance signal output from the reactance selector in response to the modulation signal.

FIG. 9 shows an example of a modulation signal 26 input to the reactance selector and the resulting output 28 which is referred to herein as the reactance signal. The example shown in FIG. 9 could be achieved, for example, using the DMSD system shown in FIG. 4 where reactive impedances 14A=10 MVAr, 14B=20 MVAr and 14C=30 MVAr. Using this example, the reactance selector can provide 0, 10, 20, 30, 40, 50, and 60 MVAr step outputs from the reactance selector function. Since the modulation signal is a continuous signal, and there is a discrete number of reactive output levels available in the DMSD system (10–60 MVAr in this example), the reactance selector function preferably utilizes a table look-up type feature to select the appropriate reactive impedance output 28 corresponding to a point on the modulation signal waveform. A deadband is included between the reactance selection in order to prevent simultaneous selection of two reactive impedance outputs at the transition points. It is important to note that the reactance selector function is designed based on specific power system requirements and the available reactance impedance steps of the DMSD system.

Figure 10:
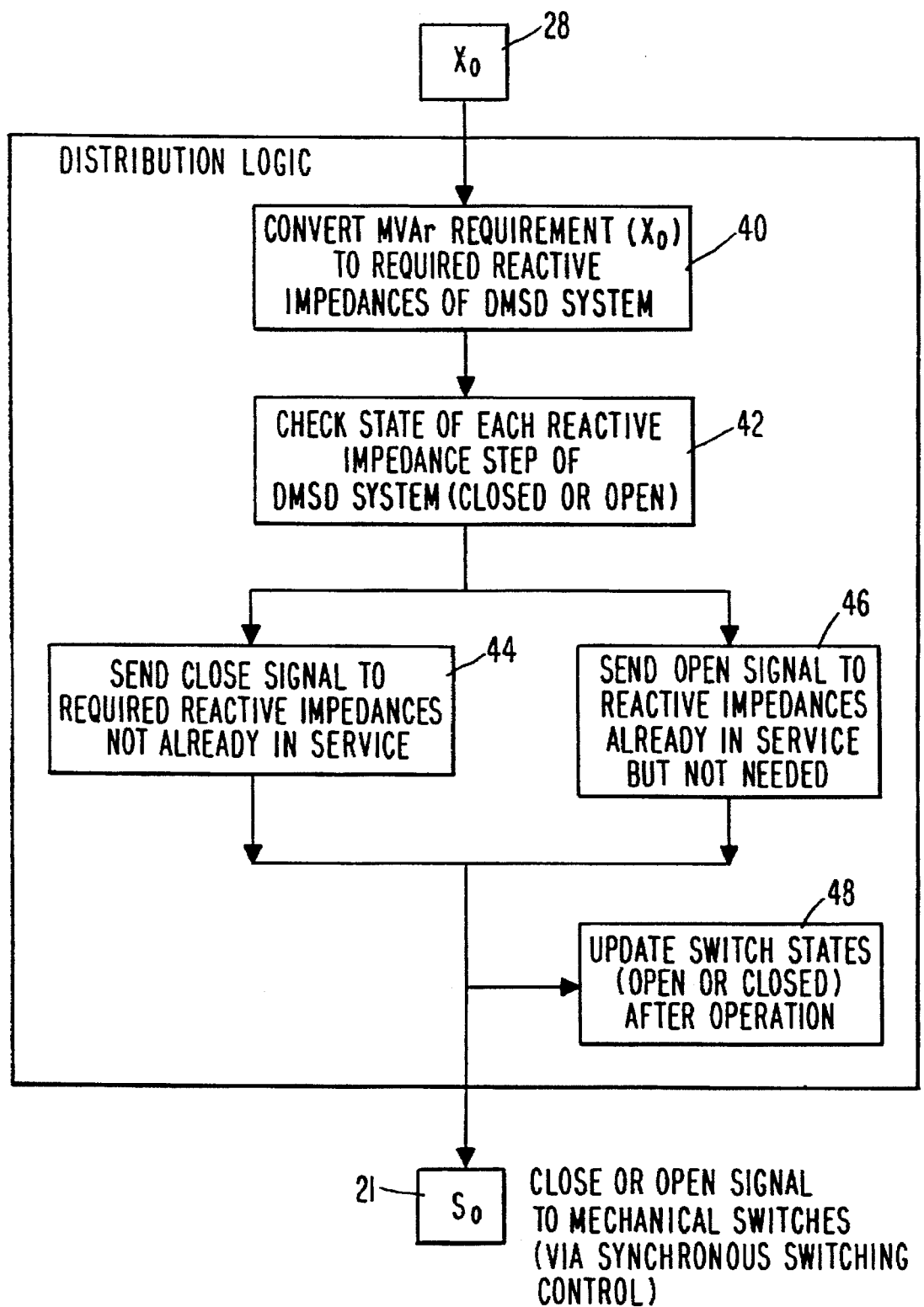
FIG. 10 is a flow diagram of the processing steps executed by the distribution logic according to a preferred embodiment of the invention.

The reactance signal 28 is then processed by a distribution logic 29 which selects the appropriate mechanical switch or switches of the DMSD system to operate taking into consideration the operating delay of the mechanical switch and which switches may already be closed or open. FIG. 10 is an example of flow diagram of the processing steps which are preferably executed by the distribution logic 29 when the reactive impedance is in the shunt configuration. At step 40, the reactance signal 28 is processed and converted to identify the reactive impedances available in the DMSD system which would provide the reactance indicated by the reactance signal and, more particularly, the combination of mechanical switches which must be opened and closed. The mechanical switches are checked at step 42 to determine whether the mechanical switches are opened or closed according to the combination of switches identified in step 40. Preferably a state table is maintained that identifies the current state of each switch in the DMSD system. Using such a state table permits the damping controller to easily identify any open switch which must be closed and any closed switch that must be open to provide the reactance specified by the reactance signal according to the combination of open and closed switches determined in step 40. At step 44, the damping controller generates a closing command signal 21 to each switch that is to be closed. At step 46, the damping controller generates an open command signal 21 to each switch that is to be opened. In a preferred embodiment in which the state table is used, the damping controller updates the state table following each switching operation. It should be understood that if the reactive impedances were in a series configuration the flow chart shown FIG. 10 would be modified accordingly.

The operation of the distribution logic may be more easily understood by way of the following example. For the purpose of this example, assume a DMSD system as shown in FIG. 4 having reactive impedances specified in FIG. 9. Further assume that 3-phase mechanical switches 13A and 13C are closed so that the 10 MVAr and 30 MVAr impedances are currently interfaced to the power system. If the reactance indicated by the reactance signal changes from 40 MVAr to 50 MVAr, the 10 MVAr impedance must be taken out of the system by opening mechanical switch 13A and the 20 MVAr impedance must be interfaced to the system by closing mechanical switch 13B. Mechanical switch 13C should remain closed. The output of the distribution logic in this case is a close command signal to mechanical switch 13B and an open command signal to mechanical switch 13A. It should be understood that the switching command signals are preferably directly output to the appropriate synchronous switching controllers 20A, 20B, and 20C which in turn generate a switching control signal 22 to initiate the operation of the respective 3-phase mechanical switch 13A, 13B, or 13C.

Figure 11:
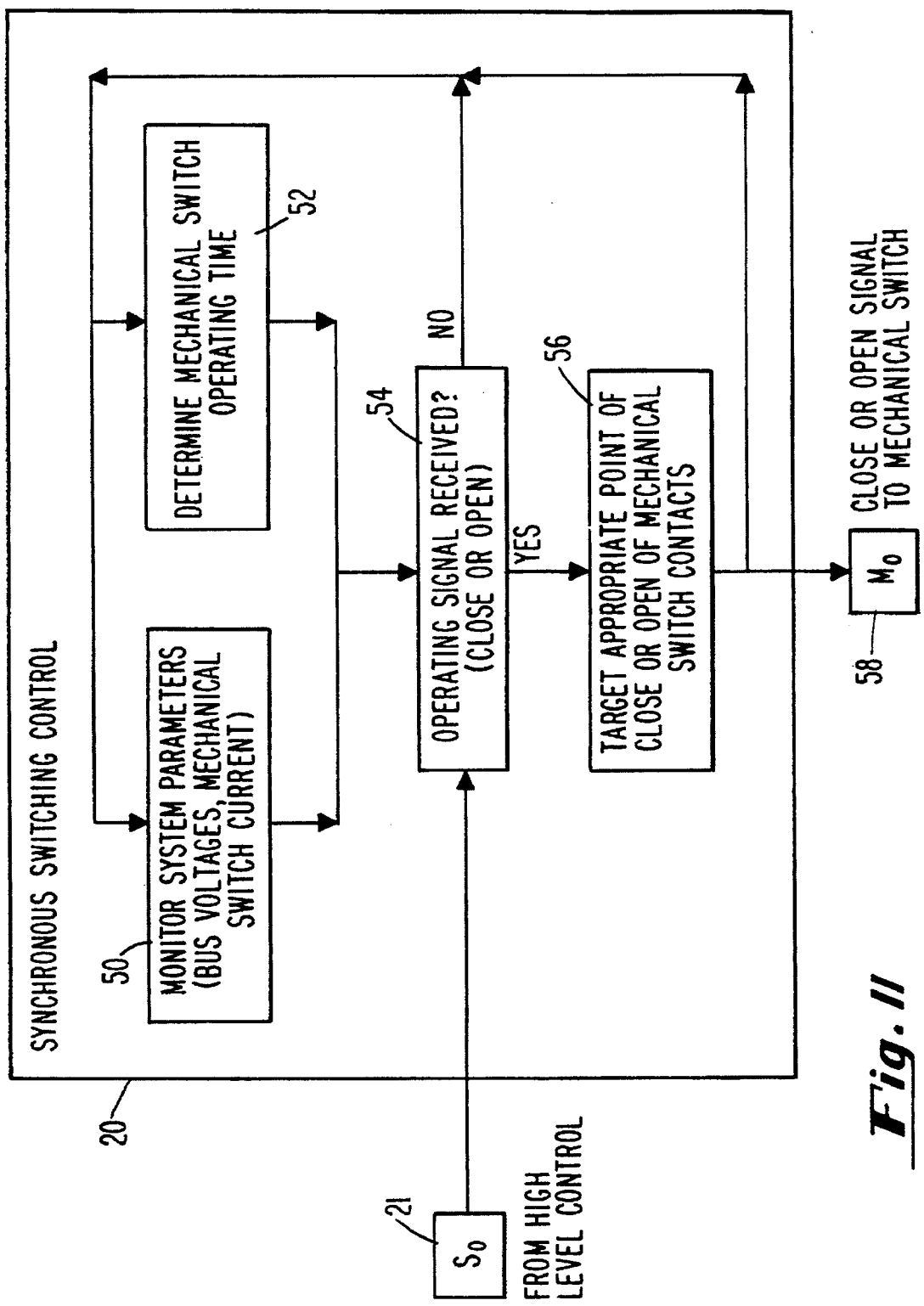
FIG. 11 is a flow diagram of the steps carried out by the synchronous switching controller according to a preferred embodiment of the invention.

The invention advantageously recognizes that the repetitive switching of reactive loads by a mechanical switch can result in voltage and current switching transient levels which can be hazardous to power system equipment. Therefore, the DMSD system preferably provides a synchronous switching controller 20 to facilitate synchronous switching as described in detail below. FIG. 11 is a flow diagram of the steps carried out by the synchronous switching controller 20. At step 50, various system parameters such as the voltage across the bus (FIG. 5, element 3) or the mechanical switch current, are monitored. The monitoring of the various system parameters is described in more detail below. Operating parameters of each mechanical switch are updated at step 52. As long as a switching command signal 21 is not received from the damping controller as determined at step 54, steps 50 and 52 are repeated.

If a switching command signal is detected as determined at step 54, the synchronous switching controller targets the appropriate opening or closing instant of the mechanical switch identified by the switching command signal to effectively synchronously open or close the mechanical switch at step 56. Once the opening or closing instant is identified at step 56, a switching control signal 58 is output adjusted for switching delays and processing time.

The monitoring of system parameters in step 50 can be more easily understood with reference to the table shown in FIG. 12. The table identifies the parameters to be monitored based on the type of reactive impedance and the desired operation of the switch, i.e. to be opened or closed. As shown in FIG. 12, for a shunt capacitor or inductor (FIG. 5), the bus voltage is monitored when the switch is to be closed and the switch current is monitored when the switch is to be opened. The transmission line current is monitored or measured if the type of reactive impedance is a series capacitor or series inductor when the switch is to be opened. The series reactive impedance voltage itself is monitored when the switch is to be closed.

Figure 13:
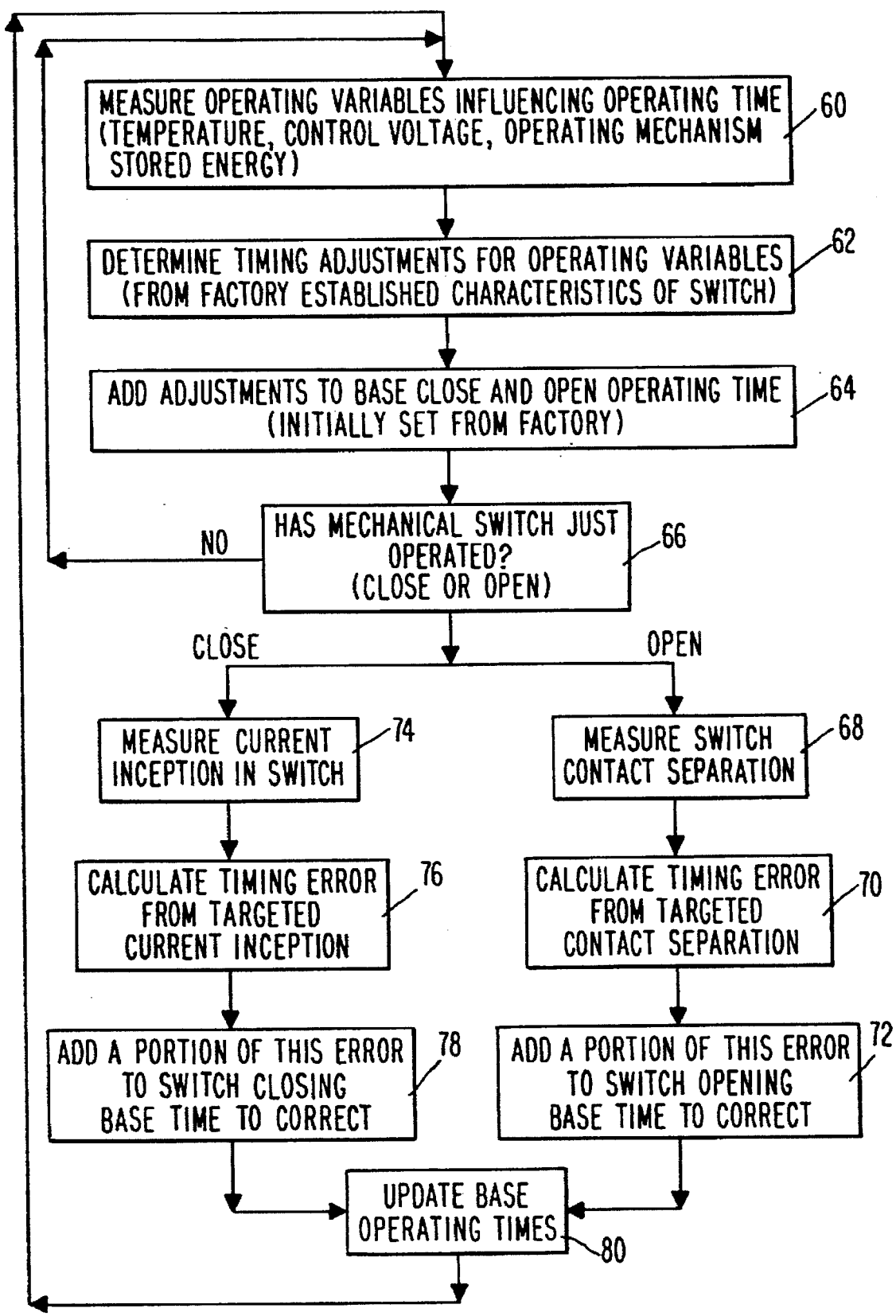
FIG. 13 shows a flow chart for determining the mechanical switch operating times.

A detailed procedure for determining the mechanical switch operating time at step 52 (FIG. 11) is shown in FIG. 13. Most commercially available mechanical switches are affected by variables such as temperature, operating voltages, and the amount of energy stored within the operating mechanism. Specifically, such variables affect the operating time of the mechanical switch, i.e., the amount of time required to open or close the switch. Predetermined base operating times for opening and closing most commercially available mechanical switches are established in advance for defined values of such variables. Changes in variable values alter these base operating times according to predetermined formulae.

At step 60 in FIG. 13, the operating variables such as temperature, control voltage applied to the operating mechanism, and the energy stored in the operating mechanism are preferably measured using appropriate probes and transducers and provided as inputs to the synchronous switching controller (FIG. 3, element 18A and FIGS. 5 and 6, element 18A). Timing adjustments using the measurements obtained in step 60 are computed in step 62 based on characteristics of the particular mechanical switch and the predetermined formulae. The base operating times are then adjusted at step 64 by the timing adjustments computed in step 62. The base operating times are repeatedly updated until the mechanical switch is operated as determined in step 66.

If the mechanical switch just opened as determined at step 66, steps 68, 70 and 72 are carried out by the synchronous switching controller. However, if the mechanical switch just closed as determined at step 66, steps 74, 76, and 78 are carried out by the synchronous switching controller. Steps 68 and 70 and steps 74 and 76 determine the timing error associated with the instant the switch actually opened or closed respectfully with respect to the instant the switch was targeted in step 56 (FIG. 11) to open or close. For example, auxiliary switches coupled to the mechanical switches may be used to determine the instant a mechanical switch actually opens in step 68. That instant may be compared to the targeted instant in step 70 to determine the timing error. Alternatively, a motion transducer may be operatively interfaced to the mechanical linkage to the interrupter to monitor the actual movement of the current-carrying contacts to identify the instant in which the switch opened. The switch current can be monitored in step 74 to determine the actual instant the switch closed. The procedure for targeting an instant to open or close the switch is discussed in detail below.

Once the timing error is established in either step 70 or 76, the appropriate base operating time should be adjusted to compensate for the timing error. It should be understood that it is preferable to filter or average the timing error before adjusting the base for optimizing system stability. Thus, the timing error is preferably processed in step 72 or 78 to determine a limited or an averaged timing error to adjust the base operating time in step 80. After the base operating time has been appropriately adjusted for the measured timing error, the synchronous controller repeats steps 50, 62, and 64 until the next switching operation determined at step 66.

The concept of synchronous switching seeks to open or close the mechanical switch at appropriate instants to minimize switching transient levels. The primary purpose of synchronous closing is to minimize closing transients and prevent system equipment damage during repeated closing operations which are required for power oscillation damping. Synchronous opening may be desired to provide an added degree of safety against restrikes and reignitions which can occur with mechanical switches when switching capacitive and inductive loads where the relatively high magnitude, short time to peak transient recovery voltages appearing across the mechanical switch following current interruption may exceed the dielectric withstand capability of the switch gap during opening. The concept of synchronous opening may be used to purposely extend the arcing time and provide better dielectric performance of the switch gap following the interruption of current.

Targeting the instant to open or close the mechanical switch (step 56 in FIG. 11) consistent with synchronous opening and closing objectives is dependent upon the type of reactive impedance interfaced to the power system by the mechanical switch. FIG. 14 presents a table outlining the desired switching instant for each type of reactive impedance. For example, the desired opening instant for any type of reactive impedance occurs when the monitored current (FIG. 12) reaches zero. In contrast, the desired closing instant for a shunt capacitor reactance corresponds to the instant the monitored voltage across the mechanical switch reaches zero. For a shunt inductor reactance, the desired closing instant corresponds to the instant the measured bus voltage peaks. A series capacitor has a desired closing instant corresponding to the instant at which the voltage measured across the capacitor reaches zero. A series inductor has a desired closing instant corresponding to the instant at which the voltage measured across the inductor peaks.

A special consideration for the repetitive synchronous closing of shunt capacitors involves accounting for the trapped charge remaining on the shunt capacitor since the last opening operation. Since the objective of synchronous closing in this case is to close at or near a voltage zero across the mechanical switch, voltage measurements on both sides of the capacitor can be used to determine the voltage zero switching target for the synchronous closing operation. However, this approach adds to the overall complexity of the system and is not needed. Therefore, according to the invention, it is recognized that shunt capacitors are specified for use in high-voltage circuit breaker to decay the trapped charge via an internal discharge resistance at a rate which leaves about 50 V or less on the capacitor after about 5 minutes. For relatively frequent operations required for power oscillation damping (about every 0.5 sec. to about every 5 sec.), it can, therefore, be assumed with little error that a majority of the trapped charge will remain after opening until the capacitor bank is again closed. The polarity of the trapped charge can then be identified by monitoring the current during the opening operation and determining whether the capacitive current was interrupted at a positive going current zero or a negative going current zero. Where the decay is not negligible, an RC time constant decay can be used to compensate for the charge trapped on the shunt capacitor.

Figure 15:
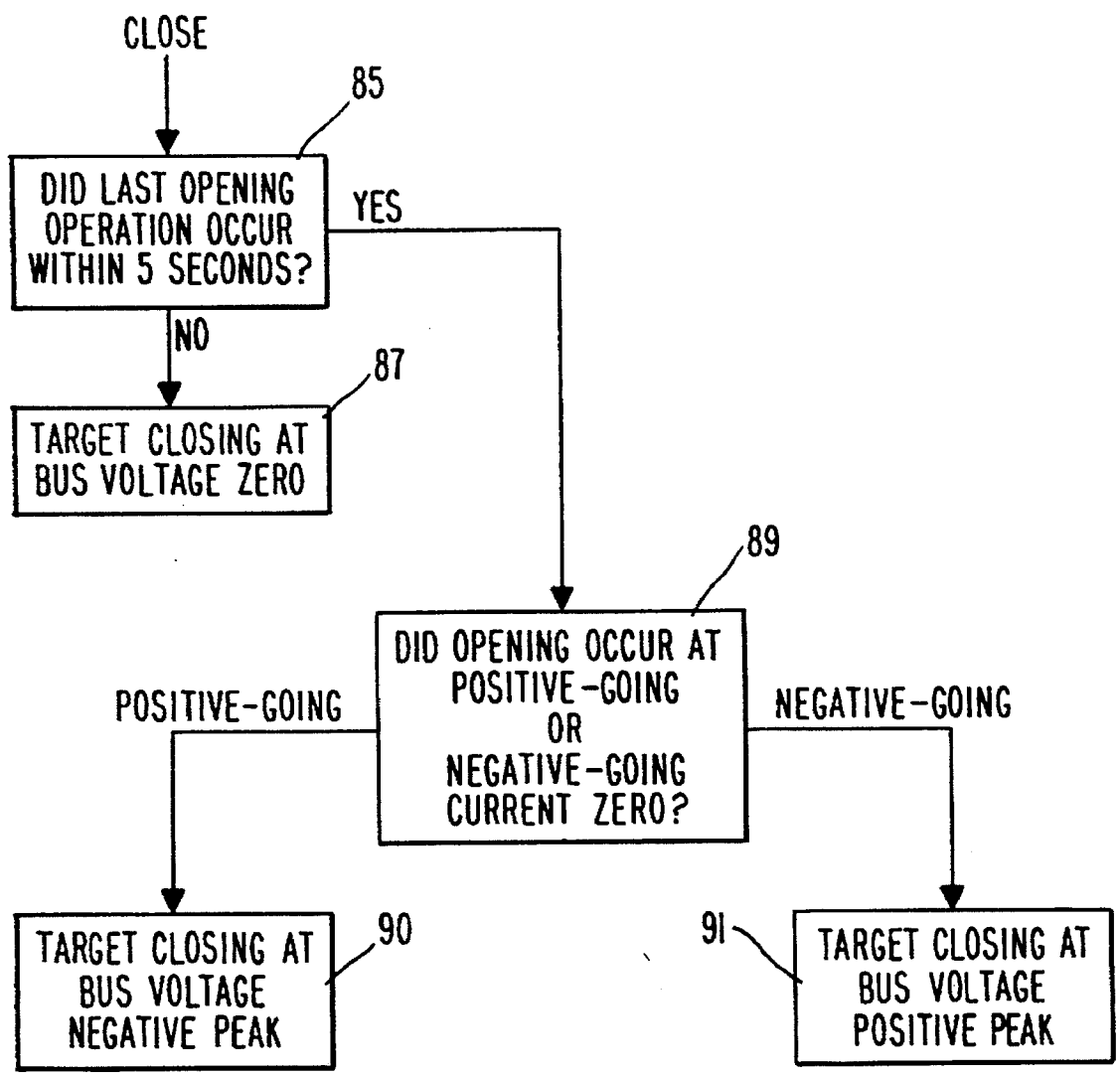
FIG. 15 shows a flow chart of the steps preferably carried out by the synchronous switching controller for repetitive switching of shunt capacitors for damping power oscillations.
Figure 16:
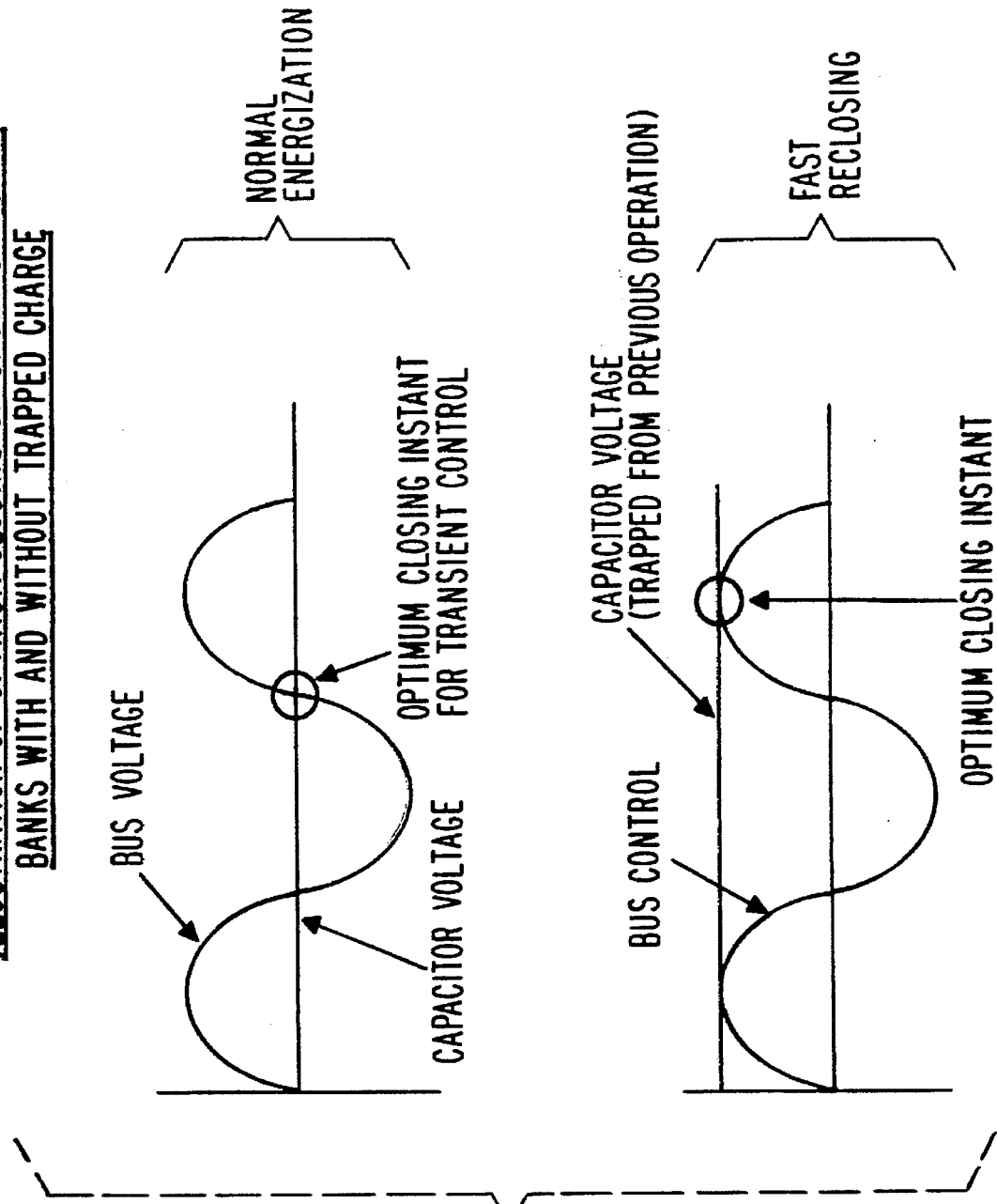
FIG. 16 shows the shunt capacitor trapped charge concept.

FIG. 15 shows a flow chart of the steps preferably carried out by the synchronous switching controller for repetitive switching of shunt capacitors for damping power oscillations. When a close command signal for a particular mechanical switch is received from the damping controller, the synchronous switching controller determines at step 85 whether that switch had been opened within a predefined period of time. The predefined period should correspond to a period of time in which the capacitor will hold its charge with minimal decay, e.g., about 5 sec. If the mechanical switch had not opened within the predefined period of time, the instant targeted for closing in step 87 corresponds to the instant when the bus voltage reaches zero. If the mechanical switch had been opened within the predefined period of time, the synchronous switching controller determines whether the current monitored before and during the opening operation was positive going or negative going in step 89. It should be understood that capacitor voltage lags behind capacitor current by 90°. Therefore, if the monitored current was positive-going, the shunt capacitor has a nearly maximum negative charge as shown in FIG. 16 within the predefined period of time. Alternatively, if the monitored current was negative-going, the shunt capacitor has a nearly maximum positive charge during the predefined period of time. Thus, to compensate for the stored charge, the instant to target in step 90 for synchronous closing following a opening during a positive going current is the bus voltage negative peak. Similarly, the bus voltage positive peak is targeted in step 91 as the closing instant to compensate for the stored charge after an opening during a negative going current.

The damping controller according to the invention is preferably implemented using a microprocessor such as an Intel 80386 or 80486. The synchronous switching controller according to the invention is preferably implemented using a dedicated microcontroller chip such as the Intel 80C196 or a digital signal processing chip such as the Motorola 56002. One of the novel features of the invention permits the controller to be configured based on the DMSD system configuration. For example, a particular DMSD system might use a number of mechanical switches where each mechanical switch is capable of interfacing a particular reactive impedance to the power system. In such a multiple-switch DMSD system, the reactive impedance interfaced by each mechanical switch has a different magnitude, and may additionally vary by type, e.g. shunt capacitor, series inductor, etc. Thus, according to the invention, the controller processors are preferably initialized with the DMSD configuration. A programmable read only memory (PROM) device may be interfaced to the processors and used for this purpose. In addition, the processors are preferably initialized with the base operating times and predetermined timing adjustment formulae associated with each mechanical switch in the DMSD system. This information may also be stored in the same PROM device or a different PROM device interfaced to the processors. Alternatively, base operating times and timing adjustment formulae for various known mechanical switches could be stored in a RAM coupled to the processors so that once the type of mechanical switch is identified, the processors would read in the relevant operating criteria from the RAM. It should be understood that numerous embodiments are possible for implementing the controller according to the invention.

The advantages of the DMSD system according to the invention are also numerous. The DMSD system uses mechanical switches having functional specification available with conventional technology, to provide power oscillation damping. In particular, these requirements include faster operating times (less than about 80 msec.) with a fast repetition rate (less than about 2.5 sec.) and the capability of providing many consecutive operation at this operating and repetition rate (preferably at least 3). The DMSD system is less restricted in application voltage than a thyristor-based system and minimizes or eliminates the need for a step-down transformer used in such thyristor-switched systems. Moreover, the DMSD system does not require the use of active cooling systems used in thyristor-switched systems. As a result of these improvements over thyristor-switched systems, the DMSD system is less complex allowing it to be moved more easily to a more appropriate location in the power system to accommodate system growth or other changes that may require such a relocation. The reduction in complexity permits easy retrofit to existing reactive compensation systems (series or shunt) with the mechanical switch and appropriate controls to convert these installations into a DMSD system. Also the use mechanical switches are characterized by significantly less continuous losses than a thyristor switch when the switch is closed.

The novel use of a mechanical switch offers opportunities in mitigating other power system phenomena in a similar way such as transient stability which is also a concern following a power system disturbance. Transient stability improvement requires a fast insertion time and possible repetitive switching of a reactive impedance at an appropriate system location during a power system disturbance to maintain power system stability. The switching time requirements and speed may be faster than that required for the power oscillation damping but it could still be achieved using the DMSD system.

The DMSD system may also compliment thyristor-switched compensation systems in a series or shunt configuration and provide an optimized cost effective system for mitigating many power system problems such as transient stability, fast voltage control and power oscillation damping in a single system. This type of enhancement could be made to a new installation or as part of a retrofit to a thyristor-switched system.

The DMSD system also provides an optimum configuration of steps and step sizes utilizing the concept of binary switching—a certain number of fixed reactive impedances are switched in stages to provide compensation levels which are a binary combination of the installed fixed reactive impedances. For example, assuming that a shunt compensation system contained reactive compensation levels of 10, 20, and 30 MVAr, the DMSD system could be controlled to provide switched compensation levels of 0, 10, 20, 30, 40, 50, and 60 MVArs by inserting and removing various combinations of the three fixed reactive compensation steps.

While the invention has been described and illustrated with reference to specific embodiments, those skilled in the art will recognize that modification and variations may be made without departing from the principles of the invention as described hereinabove and set forth in the following claims.

What is claimed:

1. A dynamic mechanically-switched damping (DMSD) system for connection to a power system, said power system being subject to various predetermined conditions including power oscillations, said DMSD comprising:

at least one reactive impedance;

a mechanical switch coupled to said at least one reactive impedance, each opening and closing of said mechanical switch electrically interfacing said at least one reactive impedance with said power system; and, a controller coupled to said mechanical switch for receiving an input of measurement signals indicative of said power oscillations, and based on said measurement signals, for controlling the operation of said mechanical switch to damp power oscillations in the power system.

2. The DMSD system of claim 1, wherein transients are generated by the operation of said mechanical switch, said controller further controlling the operation of said mechanical switch so as to minimize the generation of said transients.

3. The DMSD system of claim 1, further including sensing means and wherein said sensing means provides said output of measurement signals indicative of said various predetermined conditions including power oscillations and wherein said controller comprises:

a damping controller coupled to said sensing means to receive an input of said measurement signals and based on said measurement signals generates switching command signals indicative of damping control information; and a switching controller coupled to said damping controller, said mechanical switch and said sensing means, said switching controller having an input of said command signals and said measurement signals and based on said command signals and said measurement signals generating a switching control signal output to said mechanical switch, said switching control signal inducing operation of said mechanical switch according to said damping control information.

4. The DMSD system of claim 1, wherein said power system has 3-phase power characteristics, said mechanical switch comprises:

three current interrupting switches wherein each of said current interrupting switches is associated with one of said three phases;

an operating mechanism coupled to said controller and to each of said current interrupting switches for independently operating each of said current interrupting switches to open and close.

5. The DMSD system of claim 1, further including sensing means and wherein said sensing means measures current and voltage levels and provides said output of measurement signals including a current measurement signal indicative of the measured current and a voltage signal indicative of the measured voltage, said operation of said mechanical switch being synchronous in relation to said measurement signals.

6. The DMSD system of claim 1, wherein said reactive impedance is electrically interfaced in a shunt configuration.

7. The DMSD system of claim 1, wherein said reactive impedance is electrically interfaced in a series configuration.

8. The DMSD system of claim 1, wherein said reactive impedance is capacitive.

9. The DMSD system of claim 1, wherein said reactive impedance is inductive.

10. The DMSD system of claim 1, wherein said controller is configurable depending upon whether said reactive impedance is capacitive or inductive and whether said reactive impedance is interfaced to said power system in a shunt or a series configuration.

11. The DMSD system of claim 10, wherein said DMSD system is interfaced to said power system by a bus, said controller being additionally configurable, based on what type of reactive impedance is interfaced to the power system, to initiate an operation of said mechanical switch to correspond to one of (1) a zero voltage on the bus, and (2) a maximum voltage on the bus.

12. The DMSD system of claim 1, wherein one of said measurement signals represents an angular speed deviation of at least one generator and defining a speed deviation signal, said controller comprises:

a modulation establishing stage receiving an input of said speed deviation signal and processing said signal to generate a modulation signal having a frequency related to a frequency required to damp said power oscillations and a magnitude related to the magnitude of said power oscillations.

13. The DMSD system of claim 12, further comprising:

a plurality of mechanical switches:

a plurality of reactive impedance, each of said reactive impedances being interfaced with said power system by a corresponding one of said plurality of mechanical switches; and wherein said controller further comprises:

a reactance selector coupled to said modulation establishing stage for processing said modulation signal to generate a reactance signal indicative of said reactive impedance and a modulation frequency required to damp said power oscillations; and a distribution logic coupled to said reactance selector to receive said reactance signal as an input and processing said reactance signal to generate at least one switching command signal identifying which one of said plurality of said mechanical switches is to be operated and the frequency to operate said one mechanical switch.

14. The DMSD system of claim 13, wherein said controller is capable of being programmed with system configuration information comprising:

the number of mechanical switches;

the magnitude of the reactive impedance interfaced to the power system by each of said mechanical switches;

the type of reactive impedance interfaced to the power system by each of said mechanical switches; and the configuration in which each reactive impedance is interfaced to the power system by each of said mechanical switches.

15. A controller for use with a mechanical switch to damp power oscillations, said power oscillations being characterized by a frequency and a magnitude, said controller comprising:

a damping control means for receiving an input of measurement signals related to said frequency and magnitude of said power oscillations and for generating based on said measurement signals, switching command signals indicative of a reactance and a modulation frequency required to damp said power oscillations; and a switching control means coupled to said damping control means to receive an input of said switching command signals and for generating a switching control signal output to said mechanical switch whereby said mechanical switch operates to switch said reactance at a rate related to said modulation frequency.

16. A method of damping power oscillations in a power system following a power disturbance by mechanically switching reactive impedances interfaced with the power system, comprising the steps of:

monitoring parameters of the power system;

sensing said power oscillations based on said parameters so monitored and defining the same as sensed power oscillations;

generating a switching control signal in response to said sensed power oscillations, said control signal indicative of a selected reactive impedance and a frequency for switching said selected reactive impedance to damp said power oscillations;

determining an instant based on the parameters so monitored to switch said selected reactive impedance to minimize the generation of transients and defining said instant as a switching instant; and operating a mechanical switch in response to said switching control signal at approximately said switching instant to damp said sensed power oscillations.

17. The method of claim 16, wherein said reactive impedances comprises at least one of the following types:

a shunt capacitor;

a shunt inductor;

a series capacitor; and a series inductor.

18. The method of claim 16, wherein a bus connects said mechanical switch to a transmission line of said power system, said step of monitoring parameters of the power system comprises the steps of:

monitoring the operation of each mechanical switch to identify when said mechanical switch is open and when said mechanical switch is closed;

sensing the voltage across said bus when said type of reactive impedance is one of said shunt capacitor and said shunt inductor and said mechanical switch is open;

sensing the current in said mechanical switch when said type of reactive impedance is one of said shunt capacitor and said shunt inductor and said mechanical switch is closed;

sensing the current on said transmission line when said type of reactive impedance is one of said series capacitor and said series inductor and said mechanical switch is open; and sensing the voltage across said reactive impedance when said type of reactive impedance is one of said series capacitor and said series inductor and said mechanical switch is closed.

19. The method of claim 18, wherein said step of determining said switching instant comprises the steps of:

defining an opening instant based on the currents being sensed; and defining a closing instant based on the voltages being sensed.

20. The method of claim 16, wherein said power system comprises generators interconnected to loads by transmission lines, said step of monitoring parameters of said power system comprises the steps of:

determining the angular speed deviation of at least one generator; and sensing a voltage and a current characteristic of said power system.

21. The method of claim 20, wherein said step of detecting said power oscillations comprise the steps of:

generating a modulation signal based on said angular speed deviation and said voltage and current characteristics;

filtering said modulation signal through a deadband filter, the output of said deadband filter being substantially zero when no power oscillations are sensed.

22. The method of claim 21, wherein said steps of generating said switching control signal, determining said switching instant and operating said mechanical switch comprise the steps of:

selecting one of a plurality of reactance impedances based on said modulation signal and defining the same as said selected reactance impedance;

generating a reactance signal identifying said selected reactance impedance and a modulation frequency corresponding to said frequency for switching said selected reactance frequency;

identifying based on said selected reactance impedance which of a plurality of mechanical switches to operate and defining the same as selected switches;

identifying said switching instant for each selected switch so that each said selected switch is synchronously operated;

estimating a switching delay associated with each of said selected switches;

generating one switching control signal for each selected switch at an instant based on said switching delay estimated for the associated switch.

23. The method of claim 16, wherein the mechanical switch is capable of consecutive operation in less than about 2.5 seconds.

24. The method of claim 23, wherein said reactive impedance is a shunt capacitor, said step of determining said switching instant for a closing operation comprising the steps of:

identifying whether a most previous opening operation of said mechanical switch occurred on a positive-going current and, if so defining the closing instant as the negative peak of a bus voltage; and identifying whether a most previous opening operation of said mechanical switch occurred on a negative-going current and, if so defining the closing instant as the positive peak of said bus voltage.

* * * * *